(12) United States Patent
Ihde

(10) Patent No.: US 10,987,750 B2
(45) Date of Patent: Apr. 27, 2021

(54) METHODS AND APPARATUS FOR AUTOMATIC ENGINE CONTROL

(71) Applicant: Illinois Tool Works Inc., Glenview, IL (US)

(72) Inventor: Jeffrey R. Ihde, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 410 days.

(21) Appl. No.: 15/890,537

(22) Filed: Feb. 7, 2018

(65) Prior Publication Data

US 2019/0240762 A1 Aug. 8, 2019

(51) Int. Cl.
*B23K 9/10* (2006.01)
*B23K 9/12* (2006.01)
*B23K 9/095* (2006.01)

(52) U.S. Cl.
CPC ............ *B23K 9/1081* (2013.01); *B23K 9/095* (2013.01); *B23K 9/1006* (2013.01); *B23K 9/1087* (2013.01); *B23K 9/12* (2013.01)

(58) Field of Classification Search
CPC .... B23K 9/1081; B23K 9/095; B23K 9/1087; B23K 9/12; B23K 9/1006
See application file for complete search history.

(56) References Cited

U.S. PATENT DOCUMENTS

| | | | | |
|---|---|---|---|---|
| 6,103,994 A * | 8/2000 | DeCoster | ............ | B23K 9/1087 |
| | | | | 219/130.5 |
| 6,118,186 A * | 9/2000 | Scott | ......................... | H02P 9/04 |
| | | | | 290/1 A |
| 6,781,085 B2 | 8/2004 | Ulrich et al. | | |
| 6,818,860 B1 | 11/2004 | Stava et al. | | |
| 8,569,652 B2 | 10/2013 | Albrecht et al. | | |
| 2006/0037953 A1 | 2/2006 | Matthews | | |
| 2010/0193489 A1 | 8/2010 | Beeson | | |
| 2013/0327751 A1* | 12/2013 | Salsich | .................. | B23K 9/124 |
| | | | | 219/137.71 |
| 2014/0131329 A1 | 5/2014 | Meckler | | |
| 2015/0314387 A1* | 11/2015 | Starzengruber | ...... | B23K 9/1043 |
| | | | | 219/130.33 |
| 2018/0050414 A1* | 2/2018 | Hughes | ................ | B23K 9/1336 |

FOREIGN PATENT DOCUMENTS

WO 2011062875 5/2011

OTHER PUBLICATIONS

Int'l Search Report and Written Opinion Appln No. PCT/US2019/013578 dated May 15, 2019.
Int'l Search Report and Written Opinion Appln No. PCT/US2019/013578 dated Aug. 20, 2020.

* cited by examiner

*Primary Examiner* — Donnell A Long
(74) *Attorney, Agent, or Firm* — McAndrews, Held & Malloy, Ltd.

(57) ABSTRACT

Apparatus and methods are provided for a welding-type power system that includes an engine configured to drive an electric generator to provide power to a power output, wherein a power signal is applied to the power output. A sensor monitors the power signal, and a controller determines a change in the power signal based on a feedback signal received from the sensor, and controls the engine to start or stop operation in response to the change in the power signal.

20 Claims, 3 Drawing Sheets

METHODS AND APPARATUS FOR AUTOMATIC ENGINE CONTROL

BACKGROUND

Conventional welding-type power supplies provide power for welding-type tools. Some such power supplies are coupled to a fossil fuel-powered engine that drives an electric generator. In some cases, the engine continues to operate even when no power is being drawn from the system, thereby wasting fuel, increasing wear on the engine, and adding exhaust to the environment. A system that can limit engine operation when no power is being drawn is therefore desirable.

SUMMARY

Apparatus and methods are disclosed of a welding-type power system configured to automatically start and/or stop in response to a change in a monitored non-welding signal at one or more outputs of the system, substantially as illustrated by and described in connection with at least one of the figures, as set forth more completely in the claims.

In disclosed examples, a welding-type power system includes an engine configured to drive an electric generator to provide power to a power output, wherein a power signal is applied to the power output. A sensor to monitors the power signal; and a controller is configured to determine a change in the power signal based on a feedback signal received from the sensor, and control the engine to start or stop operation in response to the change in the power signal.

In some examples, a first change in the power signal corresponds to a welding process and a second change in the power signal corresponds to a battery charging process.

In examples, the controller is further configured to control the engine to operate at a first speed in response to the first change in the power signal; and control the engine to operate at a second speed in response to the second change in the power signal, wherein the first and second speeds are different.

In examples, the power output comprises a welding-type power output receptacle, a battery charger output receptacle, and an auxiliary power output receptacle, each receptacle having a respective sensor to monitor the power signal.

In some examples, a welding-type cable connected to the power output, the welding-type cable configured to transmit the power signal and welding-type power. In some examples, a welding-type torch connected to the welding-type cable, wherein initiating a welding-type process causes the controller to determine a change in the power signal based on the feedback signal; identify the change as corresponding to a welding-type mode or a battery charging mode; and control the engine to start operation in response to the change in the power signal. In examples, the controller is further configured to generate the power signal less than an approximate 30-volt signal.

In some examples, the controller is configured to control the engine to stop operation in response to the feedback signal indicating an open circuit voltage condition at the power output. In examples, a positive or negative change in a voltage level associated with the power signal to a non-zero value indicates a battery charge mode operation. In some examples, a change in a voltage level associated with the power signal to substantially zero indicates a welding mode operation.

In examples, the power signal is a non-welding power signal provided independent of welding-type power.

In some disclosed examples, a welding-type power system includes an engine configured to drive an electric generator to provide power to a power output. A sensor to monitor a characteristic associated with a power signal; and a controller. The controller is configured to determine a change in the characteristic based on a signal received from the sensor; determine a mode of operation based on the change in the characteristic; and control the engine to start to provide power to the power output in response to the change in the characteristic or the mode.

In some examples, a first change in the characteristic corresponds to a welding-type mode and a second change in the characteristic corresponds to a battery charger output.

In examples, the controller is further configured to adjust the engine speed once the engine has started based on the identified mode.

In some examples, the power output comprises a welding-type power output receptacle, a battery charger output receptacle, and an auxiliary power output receptacle. In examples, the sensor comprises a welding-type power output sensor, a battery charger output sensor, and an auxiliary power output sensor, each sensor configured to monitor a characteristic of the power signal associated with each respective output receptacle.

In some examples, a converter to condition power from the generator to supply battery charging power, or auxiliary power based on the identified mode. In examples, a wire feeder connected to the auxiliary receptacle.

In some examples, the controller is further configured to adjust the engine speed to cause the engine to start or stop operation in response to the change in the characteristic. In examples, the characteristic is one of voltage, temperature, current, or resistance.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
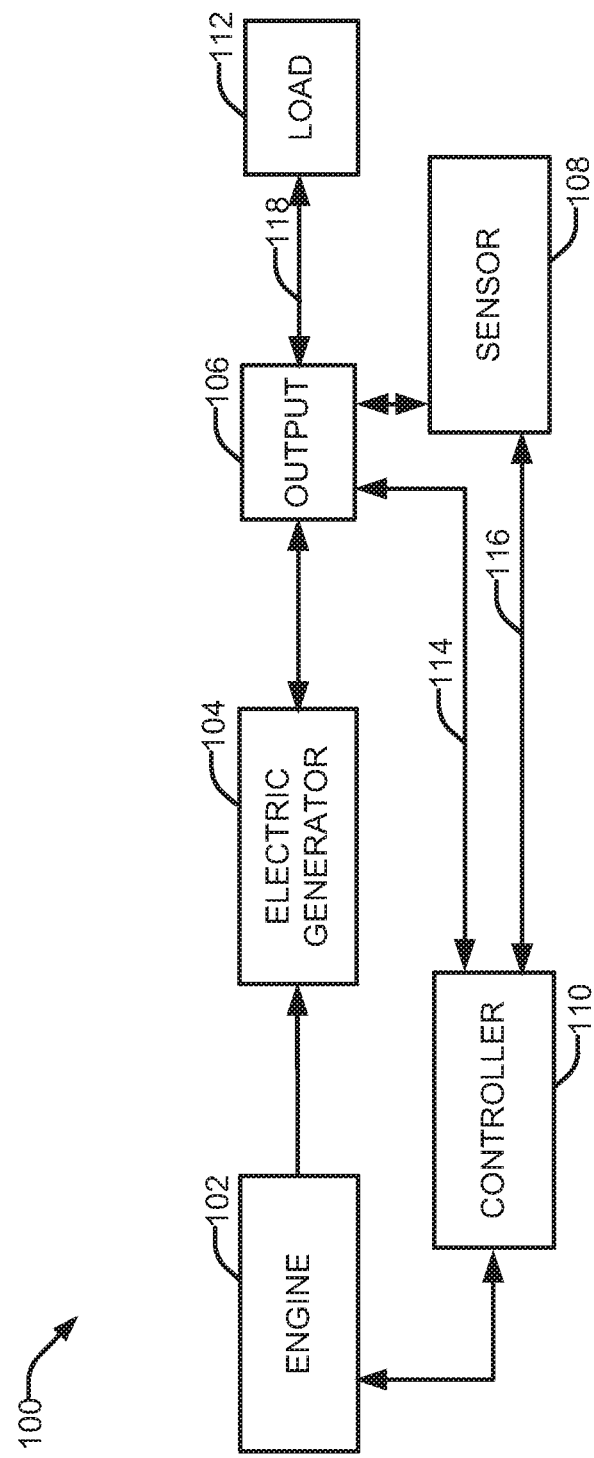
FIG. 1 illustrates a block diagram of an example welding-type power system, in accordance with aspects of this disclosure.

Disclosed are examples of an engine driven welding-type power system that is configured to monitor a power signal (e.g., a test signal, a low-power signal, etc.) at an output, and to automatically start the system (e.g., the engine) when a change in the signal indicates a load is present at the output.

Engine driven welding systems can be employed to turn an electric generator used to power welding-type tools (e.g., a welding-type torch, a wire feeder, a plasma torch, etc.), recharge energy storage devices, and power auxiliary loads (e.g., wire feeders). The engine driven welding system can be in use for extended periods of time, even as no power demand exists. When the system is not actively providing power to a tool, etc., the engine can be stopped (i.e. not rotating) to reduce wear on the system, fuel consumption, exhaust, noise, and other deleterious effects.

However, activating a stopped engine requires an input, typically from a user interface, which can be difficult for an operator engaged in an active project. For example, a welder may be operating at a worksite some distance from the engine driven power supply, with a welding torch connected to the power supply via a cable.

Conventional systems require operators to take specific actions to start, restart (e.g., increase output) or stop the system, such as activating a control on the engine itself, and/or relying on an external device (e.g., a remote control). As a result, operators may miss one or more required steps; remote controls may become lost and/or left in inconvenient places (and therefore go unused); and project quality and/or productivity suffered.

For the reasons provided, it is beneficial to have the engine stopped during the time take to prepare the worksite for welding. Once prepared, time and effort would be lost if the welder had to leave the worksite to activate the engine to perform the weld. Additionally or alternatively, if an auxiliary load is used for the project (e.g., a wire feeder), an automatic response would similarly enhance the welder's productivity while providing the benefits of the on-demand engine drive system.

To provide an automatic response from a stopped engine, the disclosed welding-type system is configured to monitor a power signal at an output, and to automatically start the system when the signal indicates a load is present at the output. For example, in an engine driven power system, the engine can be turned off and the power signal can be applied to the output. When a feedback signal indicates a change in a characteristic of the power signal (e.g., a change in the voltage, current, etc.), a controller can automatically command the engine to start. Thus, the engine can be off, yet the continuous monitoring of the power signal (e.g., a non-welding power signal) can provide an automatic engine response for an operator.

In some examples, the system is further configured to stop the engine when the feedback signal indicates there is no power demand at the output for a threshold period of time.

The non-welding power signal is provided to one or more power outputs associated with the system (e.g., a welding-type output, an auxiliary power output, a battery charge circuit, etc.). For example, a low power signal can be generated by a circuit powered by stored energy (e.g., via a battery). When the controller (e.g., comparator circuit, etc.) measures a change in the signal (e.g., a change in voltage level), the system is configured to restart in response.

In an example, connection and operation of a welding-type tool would provide a change in a characteristic of the non-welding signal to effectively zero. This is due to application of an electrode of the welding-type tool to a return (e.g., the electrode making contact with a workpiece that is connected to ground). Thus, if the controller determines an effective drop in voltage to zero, the controller can respond by starting the engine to provide welding-type power. Moreover, the controller can be configured to initiate other actions upon determination that the system is performing a welding process (e.g., adjust the speed of the engine; activate an associated wire feeder; etc.).

In some examples, a demand from a battery charging output may be determined by a positive change in a characteristic of the non-welding signal. For example, connecting a battery with a voltage level greater than a voltage level associated with the non-welding signal may result in an increase in the sensed voltage level. Conversely, connecting a battery with a voltage level below the voltage level associated with the non-welding signal may result in a decrease in the sensed voltage level. In either event, the change in voltage would result in a non-zero value, aiding in the controller making a distinction between connection of a welding-type tool and a battery.

In the other power circuits, such as connection of a wire feeder, the characteristic associated with the non-welding signal would decrease. In some examples, the change in signal will follow a recognizable pattern and/or achieve a threshold value. A memory or other system (e.g., networked information) may provide a list or library of patterns and/or thresholds associated with varying types of devices and/or modes of operation, including welding-type tools, auxiliary devices, battery types, etc. Based on a change in the signal, and/or a determination that the change in the signal corresponds to a particular device and/or mode, the controller can command a predetermined response or set of actions from the system (e.g., starting the battery, activating an auxiliary device, generate an alert, etc.).

For instance, if the change in the non-welding signal determines a rechargeable battery is connect to an output based on a determined battery charging mode, the controller can command the engine to start, achieve a predetermined speed, activate the output associated with the rechargeable battery, and/or deactivate other outputs. Such a sequence or other actions based on changes to the monitored non-welding signal can be stored in the memory, and/or be provided by an operator via a user interface.

Advantageously, by contrast to conventional systems, the presently disclosed system has multiple benefits, such as a reduction in fuel consumption, noise and emissions; increased engine life with the reduction in unnecessary engine run time, which will improve engine performance.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "controller" or "control circuitry" includes digital and/or analog circuitry, discrete or integrated circuitry, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a super capacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

FIG. 1 is a block diagram of an example welding-type power system 100. The example power system 100 includes an engine 102 connected to an electric generator 104 to feed an output 106 (e.g., a power receptacle). A load 112 can connect to the output, such as via a cable 118. A sensor 108 (e.g., one or more sensors) monitors changes in one or more characteristics (e.g., voltage, current, resistance, etc.) associated with a non-welding power signal 114 (e.g., a test signal, a low power signal, etc.) applied to the output 106. The signal 114 can be generated by a controller 110, which provides the signal to the output 106. Further, a feedback signal 116 can be provided from the sensor 108 to the controller 110 to determine a state, mode, condition, etc., based on analysis of the feedback signal 116.

The system sensor(s) 108 monitors signals corresponding to, among other things, voltage, current, resistance, temperature, etc. The information is then provided as feedback to the controller 110 to determine when the engine 102 is to be employed to generate output power, for how long, at what level, etc. For example, the controller can continuously or periodically transmit the power signal 114 to continually monitor a state (e.g., connection status, type of load 112, etc.) at the output 106 (e.g., to determine when a welding-type torch is connected, a rechargeable battery is connected, an auxiliary device is connected, what level of power is required at the output, etc.).

In some examples, the power signal 114 is a low voltage signal (e.g., 30 volts). Higher levels of voltage can be used, such as with lower current levels, which maintains a lower power output at the output 106.

Activating the engine 102 to generate power based on the monitored change in the power signal 114 may be driven automatically by the controller 110. In an example, the change in power signal 114, such as by connecting or activating a device at load 112, generates an automatic response by the controller 110 to activate the engine 102 from off to on.

The welding-type power system 100 can provide power to various loads 112, such as welding-type power to a welding-type torch (e.g., MIG, TIG, GMAW, FCAW, plasma cutter, etc.), power to an auxiliary device (e.g., a preheating device, a wire feeder, a grinder, lighting, etc.), as well as provide battery level power to charge a battery.

In an example, the power output 114 is configured for a particular type of connection (e.g., a welding-type torch cable), while in other examples the power output 114 can be modified to accept multiple types of connectors. In the example of FIG. 1, the output 106 may be configured with multiple connection outputs, and/or one or more adapters to accommodate various loads 116 (e.g., a welding-type torch, a rechargeable battery, 120-volt power cord, etc.).

Thus, in an example, the controller 110 can calculate a change in the signal 114 based on the feedback signal 116. The change can be associated with a change in voltage, which can indicate a welding type tool is in use (e.g., a change to effectively a zero voltage) or that a battery charging operation is in progress (e.g., a change in voltage to a non-zero value). In response, the controller 110 can command the engine 102 to start to generate power for the output, as explained further with respect to FIG. 2.

Figure 2:
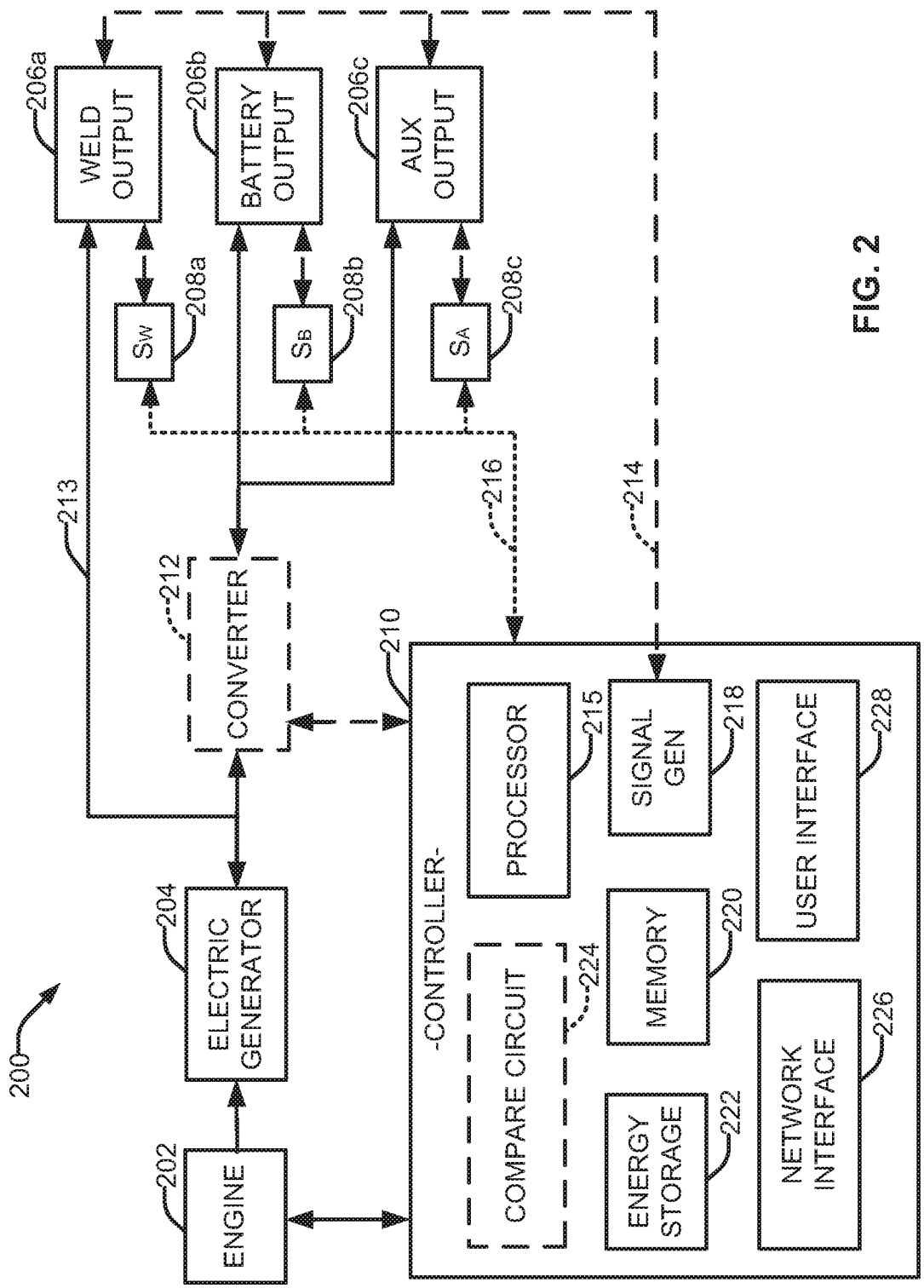
FIG. 2 illustrates a block diagram of another example a welding-type power system, in accordance with aspects of this disclosure.

FIG. 2 is a block diagram of an example welding-type power system 200. System 100 can be configured to operate with one or all of the features disclosed with respect to system 200, as provided herein. The example power system 200 includes an engine 202 connected to an electric generator 204 to provide a power output 213 with a voltage sufficient to power a welding-type tool, directed to a welding output 206a, a battery charging output 206b, and/or an auxiliary power output 206c. In some examples, a converter 212 can be used to convert power for the battery charging output 206b and/or the auxiliary output 206c (e.g., to power auxiliary power components, such as a wire feeder, compressed air system, etc.).

A controller 210 is connected to the engine 202 to provide commands to start, stop, and/or adjust speed. The controller 210 can further be connected to the converter 212 to activate the converter 212 when a change and/or determined mode indicates power conversion is needed for a particular output (e.g., battery charging output 206b, and/or auxiliary power output 206c). The controller 210 can be configured as a microcontroller, or to include a processor 215, to perform as a programmable logic circuit (e.g., comparison circuit 224), a system-on-chip, a programmable logic device, and/or any other type of logic circuit. In some examples, the controller 210 can include a memory storage device 220, an energy storage device 222, and/or a signal generator 218 to produce low power, non-welding signal 214, represented by dashed lines in FIG. 2.

The comparison circuit 224 can be implemented in hardware and/or software, and can be configured to calculate a difference between two instantaneous signals (e.g., signals 214 and 216), determine differences in one or more of the signals over time, and/or compare signal information stored in the memory 220. For example, information related to trend analysis, threshold values, profiles associated with changes in the signal, etc., can be stored in a comparison chart, list, library, etc., within memory 220.

In some examples, the comparison circuit 224 compares the generated signal 214 to feedback signal 216 (represented by dotted lines in FIG. 2) from one or more sensors 208a, 208b, 208c. For example, the sensors 208a, 208b, 208c can be configured to periodically and/or continually monitor one or more characteristics of the signal 214 (e.g., a voltage, current, temperature, resistance, impedance, etc.) to determine a change in the signal 214 associated with one or more of outputs 206a, 206b, 206c. If a change in a characteristic associated with the signal 214 is detected by the controller 210, the controller 210 can control the engine 202 to start, stop, etc.

In an example, the controller 210 transmits the low power, non-welding signal 214 to one or more of the power outputs 206a, 206b, 206c via signal generator 218. In this example, the signal generator 218 draws power from energy storage device 222, thereby making signal generation independent of the engine 202 operations. In other words, the engine 202 can be fully turned off, yet the systems 100, 200, can operate as disclosed herein.

The signal 214 is monitored by the one or more sensors 208a, 208b, 208c, which transmit the feedback signal 216 to the controller 210 for analysis. For example, the comparison circuit 224 may compare the generated signal 214 to the feedback signal 216 in real time, and/or to one or more stored parameters associated with the signals (e.g., stored within memory 220). Additionally or alternatively, processor 215 can be configured to calculate a change in signal 216 (e.g., via one or more logic routines and/or algorithms), and make a determination as to level of change, mode, etc., based on the calculation.

Based on a determination at the controller 110 (e.g., an analysis of the change in signal value, an identified mode, a comparison of the change to stored data, etc.) the controller 210 commands the engine 202 to start and generate power output 213. In any event, the controller 210 can selectively control the power provided to each output, such as in response to a change identified via a signal from a particular sensor.

Consistent with the disclosed examples, each of the outputs 206a, 206b, 206c can provide the same level of power (e.g., each operating in a welding mode or a battery recharging mode), or different levels of power. In this example, the output 206a can be operating in a welding mode, and output 206b can be powering a rechargeable battery. In yet another example, the output 206c provides auxiliary 115 or 220 VAC power, independent of or simultaneously during a welding operation to power, e.g., lights, a grinder, a battery charger, etc.

Although the example of FIG. 2 represents a single signal 214 transmitted to each output, controller 210 can transmit a dedicated signal to each output individually. Similarly, each sensor may send a dedicated feedback signal to the controller 210, which may have respective signal generators, comparison circuits, processors, and/or memory devices for each respective output.

In an example, sensor 208a can send a feedback signal 216 that indicates a change in one or more characteristic of signal 214 at the weld output 206a. The controller 210 can analyze the change in the signals and determine, for example, that a welding-type tool is set to perform a welding process. In this instance, the processor 215 and/or the comparison circuit 224 may determine the change in voltage has resulted in a zero voltage level, indicating contact with a workpiece. In response, the controller 210 can command the engine 202 to start, driving the generator 204 to produce weld output power 213

In another example, monitored characteristics of the signal 214 by the sensor 208b may provide information associated with a battery connected to battery output 206b. For instance, the connected battery may have a value of 12 volts, whereas the signal 214 is generated at 30 volts. The controller 210 will recognize a change in the signal that results in a non-zero voltage value (e.g., a positive change to 42 volts, or a negative change to 18 volts, in this example, depending on the circuits being connected in series or parallel, respectively). Thus, the controller 210 is configured to control the engine 202 and/or converter 212 based on the identified change.

Identified parameters of a particular battery may include a charge state of the starter battery, a nominal voltage of the starter battery (e.g., an output voltage when the energy storage device is charged to capacity), and/or any other parameter that can be recognized in the signal, resistance, current, temperature, for example. By monitoring the feedback signal from sensor 208b, the controller 210 can detect an end of a charging operation based on changes in the feedback signal from sensor 208b. In response to detecting the end of the charging operation (i.e., the feedback signal indicates the battery is fully charged), the controller 210 can command the system 200 to stop the engine 202 from running. In this manner, the system 100 can automatically reacts to changes in the power needs of each load 208a, 208b, 208c (e.g., as the battery becomes fully charged).

In examples, the controller includes a network interface 226 configured to send and/or receive information from a remote device (e.g., a remote computer, a cloud computing environment, etc.). The calculations, determinations, comparisons, analysis, stored data, etc., can be performed and/or updated via network interface 226.

In some examples, the system(s) 100, 200 can include an interface 228 (e.g., a switch, a computer input device, etc.) to provide option for an operator to control a function of the power sources and/or outputs at the system 100. Additionally or alternatively, the user interface 228 can include a list of operations with either a set of known parameters, or a list of operations that correspond to a learned operation. Thus, the known or historical actions and conditions during a particular operation will aid in the determination of when to start, stop or adjust a speed of the engine(s) 102, 202.

In examples, information regarding system usage trends based on the monitored signals can be analyzed and stored (e.g., in memory 220). These stored trends can be used to predict when the controller 210 should control the engine 202 to start, stop and/or adjust speed in response to a change in the signal 216 and/or a determined mode. The usage trends can be specific to the system 100, 200, or be loaded onto the memory 220 (via interfaces 226, 228) to reflect usage trends of other systems.

Additionally or alternatively, one or more component may be in direct communication with another component, for example, one or more of the various system components (e.g., the controller 210) can be directly linked to any one or more of the other components (e.g., the electric generator 204, the outputs 114, the sensors 122, etc.) to facilitate communication.

In examples, the converter 212 can be configured to, for example, convert power from DC to AC or vice versa, or adjust the voltage level, as needed for a particular output. In some examples, the converter 212 can be a buck converter, wherein in other examples, the converter is a boost converter, or some combination thereof (e.g., a bi-directional converter).

In some examples, the energy storage device 222 is a rechargeable battery pack (e.g., a lithium-ion battery, a nickel-metal hydride battery, lead-acid battery, etc.). In other examples, the energy storage device 222 is a hybrid battery module, a capacitor, a supercapacitor, or any other type of suitable storage device.

Figure 3:
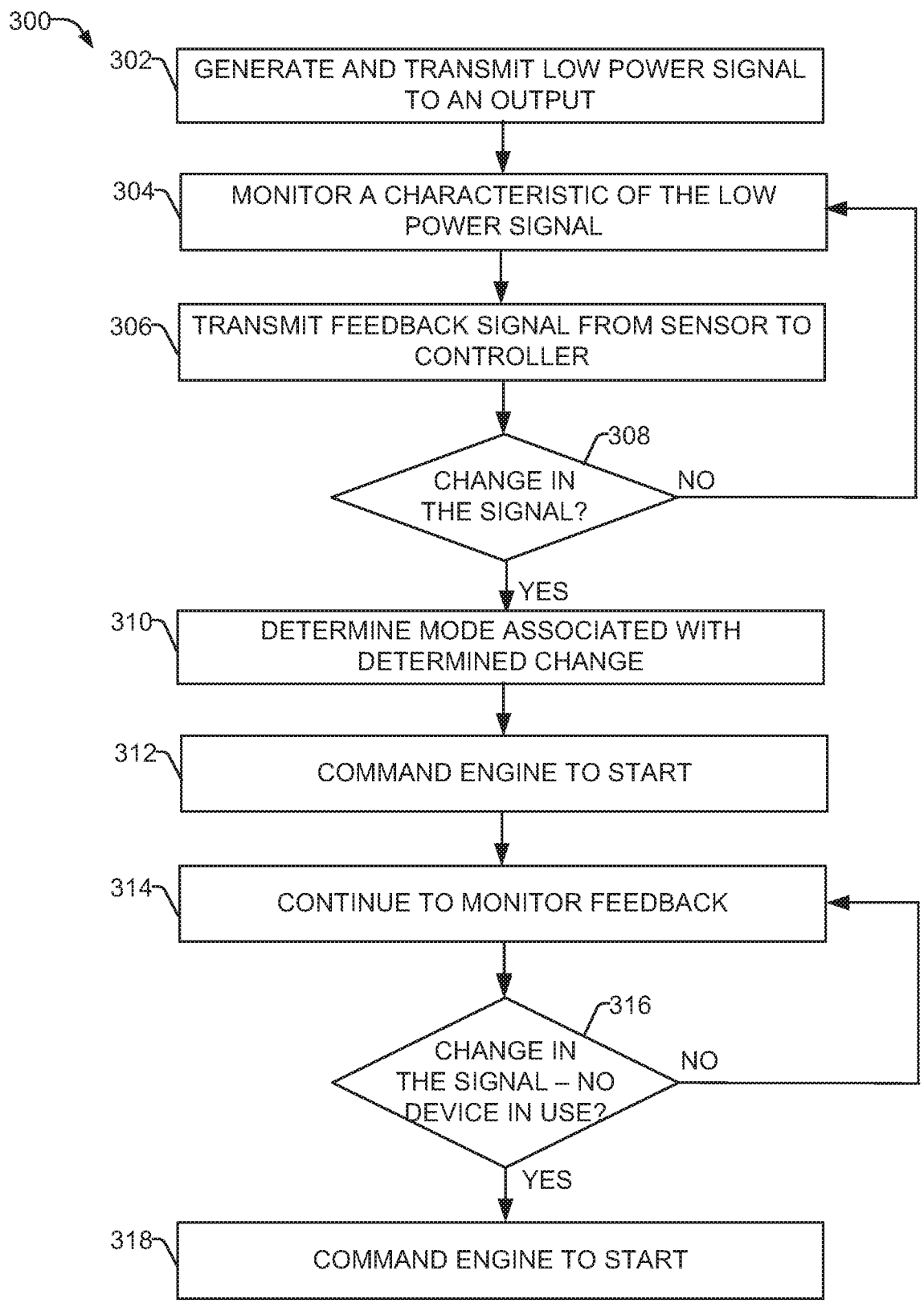
FIG. 3 illustrates example method of operating a welding-type power system, in accordance with aspects of this disclosure.

FIG. 3 is a flowchart illustrating example method 300 of operating a welding-type power system, for example, the welding-type power system 100 of FIG. 1 and the welding-type power system 200 of FIG. 2. The method 300 of FIG. 3 may be implemented by a controller (e.g., controllers 110, 210) by executing machine-readable instructions, such as stored on a non-transitory machine-readable storage device (e.g., memory 220).

At block 302 of method 300, a low power, non-welding signal (e.g., signals 114, 214) is generated and transmitted to an output (e.g., outputs 106, 206a-206c). At block 304, a sensor (e.g., sensors 106, 206a-206c) monitors the signal. At block 306, a feedback signal (e.g., signals 116, 216) from the sensor is transmitted to a controller (e.g., the controllers 110, 210) for analysis.

At block 308, the controller determines if there was a change in the signal. If no change is determined, the method returns to block 304 for continued monitoring. For example, the controller can calculate an instantaneous difference between the non-welding signal and the feedback signal, determine differences in one or more of the signals over time, and/or compare a signal to information stored in memory (e.g., memory 220). If the controller determines there was a change in the signal, the method advances to block 310, where the controller determines a mode (e.g., a welding mode, a battery charging mode, an auxiliary mode, etc.) associated with the change.

In block 312, the controller commands the engine to start, thereby producing power for the output. In block 314, the controller analyzes the feedback signal from the sensor as it continues to monitor the non-welding signal at the output. In block 316, the controller determines whether a change in the feedback signal indicates no device is in use (e.g., no power draw, no device is connected to the output, etc.). If a device is in continuing operation, the method returns to block 314 to continue monitoring the signal during ongoing operations. If, however, the controller determines no device is in use, the method advances to block 318, where the controller commands the engine to stop.

As described herein, the systems and methods provide an improved welding-type power system configured to automatically start and/or stop in response to a change in a monitored non-welding signal at one or more outputs of the system, with multiple benefits over conventional systems, such as a reduction in fuel consumption, noise and emissions; increased engine life with the reduction in unnecessary engine run time, which will improve engine performance.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
   an engine configured to drive an electric generator to provide power to a power output, wherein a power signal is applied to the power output;
   a sensor coupled to the power output to monitor a feedback signal of the power signal; and
   a controller configured to:
      generate the power signal as a test signal independent of the power provided from the electric generator to the power output;
      determine a change in the power signal based on the feedback signal received from the sensor; and
      control the engine to start or stop operation in response to the change in the power signal.

2. The system of claim 1, wherein a first change in the power signal corresponds to a welding process and a second change in the power signal corresponds to a battery charging process.

3. The system of claim 2, wherein the controller is further configured to:
   control the engine to operate at a first speed in response to the first change in the power signal; and
   control the engine to operate at a second speed in response to the second change in the power signal, wherein the first and second speeds are different.

4. The system of claim 1, wherein the power output comprises a welding-type power output receptacle, a battery charger output receptacle, and an auxiliary power output receptacle, each receptacle having a respective sensor to monitor the power signal.

5. The system of claim 1, further comprising a welding-type cable connected to the power output, the welding-type cable configured to transmit the power signal and welding-type power.

6. The system of claim 5, further comprising a welding-type torch connected to the welding-type cable, wherein initiating a welding-type process causes the controller to:
   determine a change in the power signal based on the comparison between the power signal and the feedback signal;
   identify the change as corresponding to a welding-type mode or a battery charging mode; and
   control the engine to start operation in response to the change in the power signal.

7. The system of claim 6, wherein the controller is further configured to generate the power signal less than an approximate 30-volt signal.

8. The system of claim 1, wherein the controller is configured to control the engine to stop operation in response to the comparison between the power signal and the feedback signal indicating an open circuit voltage condition at the power output.

9. The system of claim 1, wherein a positive or negative change in a voltage level associated with the power signal to a non-zero value indicates a battery charge mode operation.

10. The system of claim 1, wherein a change in a voltage level associated with the power signal to substantially zero indicates a welding mode operation.

11. The system of claim 1, wherein the controller further comprises a signal generator to continuously or periodically generate the power signal as a non-welding power signal provided independent of welding-type power, the controller further configured to transmit the power signal to the one or more outputs.

12. A welding-type power system, comprising:
an engine configured to drive an electric generator to provide power to a power output;
a sensor coupled to the power output to monitor a characteristic associated with a power signal, wherein the power signal is a non-welding power signal provided independent of welding-type power and independent of a load connected to the power output; and
a controller configured to:
determine a change in the characteristic based on a feedback signal of the power signal received from the sensor;
determine a mode of operation based on the change in the characteristic; and
control the engine to start to provide power to the power output in response to the change in the characteristic or the mode.

13. The system of claim 12, wherein a first change in the characteristic corresponds to a welding-type mode and a second change in the characteristic corresponds to a battery charger output.

14. The system of claim 13, wherein the controller is further configured to adjust the engine speed once the engine has started based on the identified mode.

15. The system of claim 12, wherein the power output comprises a welding-type power output receptacle, a battery charger output receptacle, and an auxiliary power output receptacle, wherein a wire feeder is connected to the auxiliary receptacle.

16. The system of claim 15, wherein the sensor comprises a welding-type power output sensor, a battery charger output sensor, and an auxiliary power output sensor, each sensor configured to monitor a characteristic of the power signal associated with each respective output receptacle.

17. The system of claim 16, further comprising a converter to condition power from the generator to supply battery charging power, or auxiliary power based on the identified mode.

18. The system of claim 12, wherein the controller is further configured to adjust the engine speed to cause the engine to start or stop operation in response to the change in the characteristic.

19. The system of claim 12, wherein the characteristic is one of voltage, temperature, current, or resistance.

20. The system of claim 12, further comprising an energy storage device to provide power to the signal generator to generate the power signal.

* * * * *